United States Patent
Budde et al.

(10) Patent No.: US 10,181,154 B1
(45) Date of Patent: Jan. 15, 2019

(54) FINANCIAL SERVICES DEVICE

(75) Inventors: William Budde, Dublin, OH (US); Giancarlo Miranda, Columbus, OH (US); Joseph Bradley Nolan, New Albany, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 744 days.

(21) Appl. No.: 13/553,410

(22) Filed: Jul. 19, 2012

(51) Int. Cl.
*G06Q 40/00* (2012.01)

(52) U.S. Cl.
CPC .................................. *G06Q 40/00* (2013.01)

(58) Field of Classification Search
None
See application file for complete search history.

(56) References Cited

U.S. PATENT DOCUMENTS

| | | |
|---|---|---|
| D282,305 S | 1/1986 | Kusenberg |
| 4,617,457 A | 10/1986 | Granzow et al. |
| D289,215 S | 4/1987 | Prinzhorn |
| D293,150 S | 12/1987 | Prinzhorn |
| 5,025,139 A | 6/1991 | Halliburton, Jr. |
| D360,734 S | 7/1995 | Hall |
| D360,735 S | 7/1995 | Hall |
| D360,739 S | 7/1995 | Hall |
| 5,482,139 A | 1/1996 | Rivalto |
| 5,513,117 A | 4/1996 | Small |
| 5,526,615 A | 6/1996 | Kaizu et al. |
| D375,607 S | 11/1996 | Hall |
| 5,619,558 A | 4/1997 | Jheeta |
| 5,705,798 A | 1/1998 | Tarbox |
| 5,721,781 A | 2/1998 | Deo et al. |
| 5,897,625 A | 4/1999 | Gustin et al. |
| 5,915,246 A | 6/1999 | Patterson et al. |
| 6,006,988 A | 12/1999 | Behrmann et al. |
| 6,045,039 A | 4/2000 | Stinson et al. |
| 6,149,046 A | 11/2000 | Ho et al. |
| 6,536,663 B1 | 3/2003 | Lozier et al. |
| 6,554,184 B1 | 4/2003 | Amos |
| 6,554,185 B1 | 4/2003 | Montross et al. |
| 6,796,490 B1 | 9/2004 | Drummond et al. |
| 6,874,612 B1 | 4/2005 | Uland |
| 7,039,600 B1 | 5/2006 | Meek et al. |
| 7,379,896 B1 | 5/2008 | Meek et al. |
| 7,644,039 B1 * | 1/2010 | Magee ............... G06Q 20/1085 221/9 |
| 2002/0133461 A1 | 9/2002 | Ramachandran |
| 2003/0040959 A1 | 2/2003 | Fei et al. |
| 2007/0102508 A1 * | 5/2007 | McIntosh ........... G06Q 20/1085 235/379 |

(Continued)

*Primary Examiner* — Jason Borlinghaus
*Assistant Examiner* — Ambreen A. Alladin
(74) *Attorney, Agent, or Firm* — Hunton Andrews Kurth LLP (57) ABSTRACT

A number of enhancements for financial services devices are provided. Financial services devices, as used herein, may include drive-up type financial services devices. These enhancements include user interface improvements as well as increasing functionality of the financial services device. Specific application of the enhancements include drive up financial services devices. The enhancements may include improved ergonomics for customer interaction and multiple display screens, as well as sensors for detection of a customer's vehicle.

18 Claims, 4 Drawing Sheets

(56) References Cited

U.S. PATENT DOCUMENTS

| | | | |
|---|---|---|---|
| 2011/0249081 A1* | 10/2011 | Kay | H04M 3/5315 348/14.03 |
| 2012/0032896 A1* | 2/2012 | Vesely | G06F 3/005 345/173 |
| 2012/0044154 A1* | 2/2012 | Black | G07F 19/205 345/173 |
| 2012/0265679 A1* | 10/2012 | Calman | G07F 19/202 705/43 |

* cited by examiner

FINANCIAL SERVICES DEVICE

FIELD OF THE INVENTION

The invention relates generally to providing financial services, such as through devices such as financial services kiosks and Automated Teller Machines that are capable of being used in a drive-up configuration.

BACKGROUND OF THE INVENTION

Financial institution customers use Automated Teller Machines ("ATMs") to perform certain financial institution transactions. At traditional ATMs, the customers have a limited selection of options for tasks and transactions to perform, as well as limited options for customization of their experience at the ATM. A level of personalization or modification of the options presented to the customer upon log-in is possible with some ATMs. U.S. Pat. No. 7,822,684, entitled "Personalized Bank Teller Machine," describes one such system for modifying or personalizing the options presented to a user of an ATM. U.S. Pat. No. 7,814,016, entitled "Personal Teller System and Method of Remote Interactive and Personalized Banking," also describes providing personalized services through a teller machine, including using audio and/or video communications between a customer and a teller at the teller machine.

Furthermore, many ATMs are not ergonomically optimized for customers, particularly in the drive-up setting. For drive-up customers to perform certain functions at the typical drive-up ATM, the customer must reach or stretch into a potentially uncomfortable position. A typical customer is deemed to pull their vehicle to 8 inches from the ATM. A normal reach range is defined as 14 to 16 inches. Also, many ATMs and drive-up ATMs lack large, clear displays and audio/visual interface capability.

These and other deficiencies exist.

SUMMARY OF THE INVENTION

Exemplary embodiments include a financial services device that includes a computer processor; a first display; a second display oriented at an angle to the first display such that both the first and second display can be viewed simultaneously and the second display is larger than the first display; and wherein the financial services devices is configured to be used by a customer from a vehicle.

These and other embodiments and advantages of the invention will become apparent from the following detailed description, taken in conjunction with the accompanying drawings, illustrating by way of example the principles of the various exemplary embodiments.

DETAILED DESCRIPTION OF THE PREFERRED EMBODIMENTS

It will be readily understood by those persons skilled in the art that the embodiments of the inventions described herein are capable of broad utility and application.

Accordingly, while the invention is described herein in detail in relation to the exemplary embodiments, it is to be understood that this disclosure is illustrative and exemplary of embodiments of the invention and is made to provide an enabling disclosure of the invention. Accordingly, the disclosure is not intended to be construed to limit the embodiments of the invention or otherwise to exclude any other such embodiments, adaptations, variations, modifications and equivalent arrangements. While the various embodiments of the present invention are described in the context of financial transaction/services devices, such as ATMs and the like, and providing of financial service through such devices, the methods and systems described herein may be applied to other related services involving interaction with similar devices.

The following descriptions are provided of different configurations and features according to exemplary embodiments. These configurations and features may relate to providing financial services through financial services devices. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details regarding the present invention. It should also be appreciated that these exemplary embodiments are provided as non-limiting examples only.

Financial services devices, as used herein, may include machines, kiosks, and stations for performing financial services transactions. These devices may include, but are not limited to, automated teller machines ("ATMs"), personal teller machines ("PTMs"), financial self-service devices, financial services kiosks, financial transaction devices, portable electronic devices, money machines, cash machines, bank machines, and bancomats.

According to exemplary embodiments, a number of enhancements for financial services devices are envisioned. These enhancements may be in the form of user interface improvements as well as increasing functionality of the financial services device. A brief description of each follows.

Figure 1:
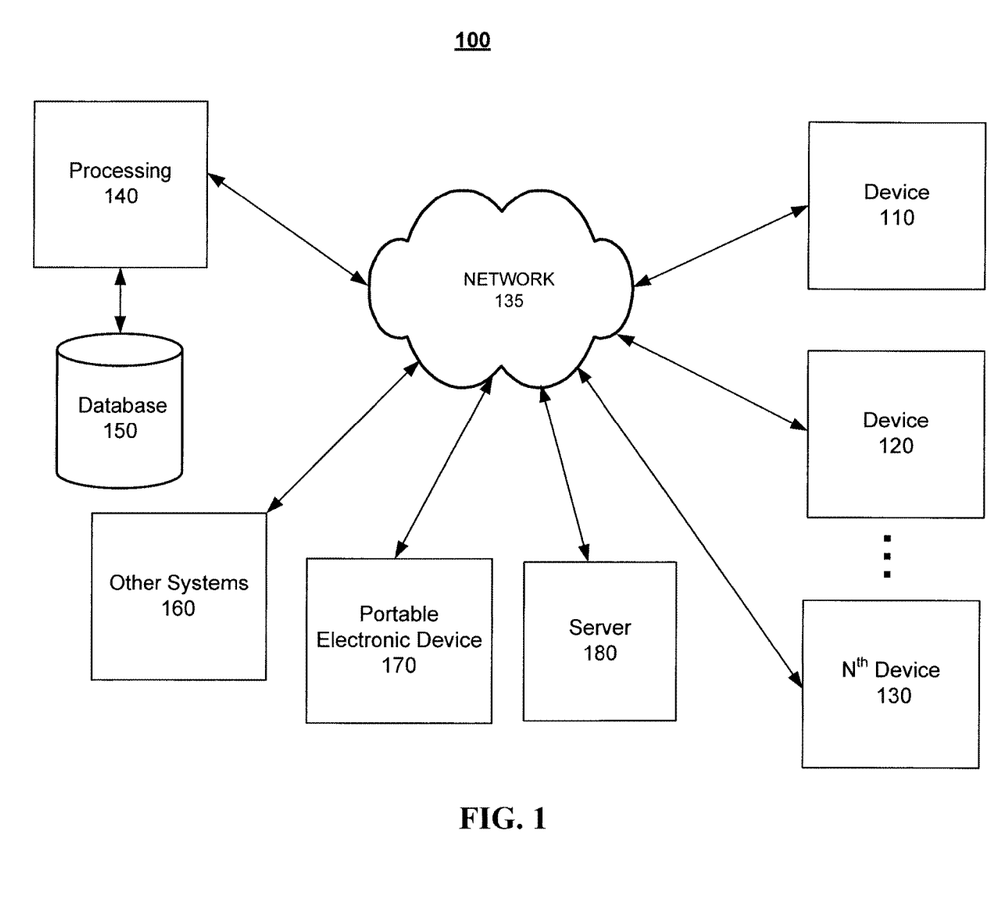
FIG. 1 is a system architecture in accordance with an exemplary embodiment.

FIG. 1 depicts a system architecture according to exemplary embodiments. The system 200 may have device 110 associated therewith. A second device 120 and an Nth device 130 may be further associated with the system 100. The devices 110, 120, and 130 may each be a processing machine. Each device 110, 120, and 130 may include software and/or modules to implement the methods described herein according to exemplary embodiments. Each device 110, 120, and 130 may provide processing, display, storage, communications, and execution of commands in response to inputs from a user thereof and respond to requests from the software and/or modules.

The devices 110, 120, and 130 may each serve as a client side. Each device 110, 120, and 130 may be a "fat" client, such that the majority of the processing may be performed on the client. Alternatively, the device 110, 120, and 130 may each be a "thin" client, such that the majority of the processing may be performed in the other components of the system 100 as shown in FIG. 1. The devices 110, 120, and 130 may be configured to perform other functions and processing beyond the methods described herein. The devices 110, 120, and 130 may each be a part of a larger system associated with the financial institution. The devices 110, 120, and 130 may be multi-functional in operation.

Each device 110, 120, and 130 may have a display and an input device associated therewith. The display may be monochrome or color. The display may be high-definition (HD) capability. For example, the display may be a plasma, liquid crystal, or cathode ray tube type display. The displays may be touch screen type displays. The devices 110, 120, and 130 may have more than one display. The multiple displays may be different types of displays. The display may have sub-displays there on. For example, the device 110, 120 and 130 may have a large display surface. The display for the user interface may occupy a portion or less than the whole of the large display surface.

The display may be adjustable in both location and in orientation/sizing on the device 110, 120, and 130. The display may be adjusted by the device automatically based on a set of inputs. For example, one or more cameras, optical sensors, or other sensing devices may be used to adjust the height of the display based upon a sensed height of the user at the device. The sensors may be computer controlled and may capture digital images. The display may be adjusted by a user and the user may save the display adjustments. A combination of adjustment methods may be employed.

The input device may be a single device or a combination of input devices. For example, the input devices may include a keyboard, both full-sized QWERTY and condensed, a numeric pad, an alpha-numeric pad, a track ball, a touch pad, a mouse, selection buttons, and/or a touch screen. As described above, the display may serve as an input device through using or incorporating a touch screen interface. The devices 110, 120, and 130 may include other devices such as a printer and a device for accepting deposits and/or dispensing currency and coins.

According to some embodiments, the devices 110, 120, and 130 may be financial services devices as described herein. The financial services device may be a transaction device for conducting transactions with the financial institution. For example, the devices 110, 120, and 130 may be a traditional or typical ATM. The devices 110, 120, and 130 may be financial services kiosks. In some embodiments, the devices 110, 120, and 130 may be a portable or hand-held computing or electronic device, or other type of computing device, that has the described functionality. For example, the devices 110, 120, and 130 may be a tablet computing device. Additional devices may be coupled to the portable or hand-held computing device to perform various functions such as accepting deposits or dispensing currency.

The devices 110, 120, and 130 may have a log-in device associated therewith. The log-in device may be used to allow access to the device. The log-in device may require a particular input or it may accept a combination of inputs. The input may serve as an authentication of the user to the device 110, 120, or 130 and the system 100 in general. Various authentication or log-on systems and methods may be used. For example, these methods and systems may include entering a password or PIN (Personal Identification Number) or using a card to log-on, either via swiping the card through a reader, such as a magnetic stripe reader or a smart chip reader, or through a radio frequency system (which may require that the card be placed in proximity to an appropriate reader (i.e., a contactless system), such as RFID (Radio Frequency Identification) or NFC (Near Field Communications). For example, the Blink® system may be used. It should be appreciated that the card may include a combination of a magnetic stripe, a smart chip, and radio frequency. Further, the use of the card is exemplary only and the card may include fobs, stickers, and other devices. Biometrics may be used, such as fingerprints, facial recognition, speech recognition, or retinal scan. A combination of these systems may be used. Biometrics may be used in addition to other log-in methods and systems.

The devices 110, 120, and 130 may provide various functionality and features for conducting transactions with the financial institution. Accordingly, the devices 110, 120, and 130 may be referred to as financial transaction devices. For example, the devices 110, 120, and 130 may be capable of accepting deposits and mixed deposits, withdrawals and multi-denomination withdrawals, coin deposits/withdrawal, check cashing, statement printing, wires, bill pay and check printing. It should be appreciated that the devices 110, 120, and 130 may be capable of other functions and features. Transactions may be supported relating to other financial institutions. For example, the device may be part of a network associated with more than one financial institution. The network may be managed by a third party.

The devices 110, 120, and 130 may be communicatively coupled to a network 135. Accordingly, the devices 110, 120, and 130 may be geographically dispersed. Conversely, two or more of devices 110, 120, and 130 may be located in close proximity to provide a cluster of devices for customer use. For example, the devices may be located within or near a branch office of the financial institution. The devices may be located in other locations such as retailers or merchants. Network 135 may be a computer based network, with one or more servers and/or computer processors. For example, network 135 may be the Internet or a network connected to the Internet. The network 135 may be a satellite or cellular based network. Information and data may be exchanged through the network 135 between the various components of the system 100. In alternative embodiments, the network 135 may be a local area network within the financial institution that may be connected to or interface with the Internet. It should be appreciated that the network 135 may be a combination of local area networks, wide area networks, and external networks, which may be connected to the Internet.

The processing module 140 may be communicatively coupled to the network 135. The processing module 140 may perform operations associated with the establishment, configuration, and application of the programs accordingly to exemplary embodiments. The processing module 140 may consist of one or more servers and/or general purpose computers, each having one or more computer processors associated therewith.

The processing module 140 may have a database 150 communicatively coupled thereto. The database 150 may contain data and information used by the system 100. For example, the database 150 may store account data for financial institution account holders. Additional information maybe contained therein related to the operation and administration of the system 100. The database 150 may include any suitable data structure to maintain the information and allow access and retrieval of the information. For example, the database may keep the data in an organized fashion. The database 150 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 150 may be stored in any suitable storage device. The storage device may include multiple data storage devices. The multiple data storage devices may be operatively associated with the database 150. The storage may be local, remote, or a combination thereof with respect to the database. The database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database may have back-up capability built-in. Communications with the database 150 may be over a network, such as the network 135, or communications may be over a direct connection between the database 150 and the processing module 140, as depicted in FIG. 1. Data may be transmitted and/or received from the database 150. Data transmission and receipt may utilize cabled network or telecom connections such as an Ethernet RJ15/Category 5 Ethernet connection, a fiber connection, a traditional phone wireline connection, a cable connection or other wired network connection. A wireless network may be used for the transmission and receipt of data.

The system 100 may have other systems 160 associated therewith. These other systems 160 may include various data collection and support systems used by the financial institution to carry out its functions.

The system 100 may include a portable electronic device 170. The portable electronic device 170 may be more than one portable electronic device. The portable electronic device 170 may be associated with a customer. The customer may interact with the portable electronic device through various input means (not shown). For example, the portable electronic device 170 may have a display screen to convey information to the customer. The display may be a color display. For example, the display may be a Liquid Crystal Display ("LCD"). The portable electronic device 170 may have one or more input devices associated with it. For example, the portable electronic device 170 may have an alpha-numeric keyboard, either physical or virtual, for receiving input. The portable electronic device 170 may have a QWERTY style keyboard, either physical or virtual. The portable electronic device 170 may have a pointing device associated therewith, such as, for example, a trackball or track wheel. As described above, the portable electronic device 170 may have communication capabilities over both cellular and wireless type networks to transmit/receive data and/or voice communications.

The portable electronic device 170, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device. The portable electronic device may use standard wireless protocols which may include IEEE 802.11a, 802.11b, 802.11g, and 802.11n. Such portable electronic devices may be Global Positioning System (GPS) capable. GPS is a satellite based system which sends a signal allowing a device to define its approximate position in a coordinate system on the earth. That is, the portable electronic device may receive satellite positioning data and display the location on the earth of the portable electronic device using GPS. Other location systems may be used. The portable electronic device 170 may include one or more computer processors and be capable of being programmed to execute certain tasks.

The portable electronic device 170 may establish communications with a server 180. Communications may be established over the network 135. Upon successful initiation of communications between the portable electronic device 170 and the server 180, data may be exchanged between the device 170 and the server 180. Data may be transmitted from the portable electronic device 170 to the server 180. Data may be transmitted from the server 180 to the portable electronic device 170.

According to some embodiments, the portable electronic device 170 may interact with the devices 110, 120, or 130. Through the device 110, 120, or 130, the portable electronic device 170 may interact with the server 180 or other parts of the system 100. That is, the device 110, 120, or 130 may serve as an access point to the system 100 for the portable electronic device 170. For example, a user may conduct one or more transactions with the device 110, 120, or 130 using the portable electronic device 170.

It should be appreciated that the server may interact with other parts of the system 100, such as the devices 110, 120, and 130, as well as the processing module 140 and the other systems 160. The server 180 may be a single server or it may be multiple servers. The server 180 may server a variety of roles in the system 100.

The server 180 may have one or more storage devices associated therewith. The storage may be local, remote, or a combination thereof with respect to the server 180. The storage may utilize a redundant array of disks (RAID), striped disks, hot spare disks, tape, disk, or other computer accessible storage. In one or more embodiments, the storage may be a storage area network (SAN), an Internet small computer systems interface (iSCSI) SAN, a Fiber Channel SAN, a common Internet File System (CIFS), network attached storage (NAS), or a network file system (NFS). The storage may have back-up capability built-in. The back-up capability of the storage may be used to archive image data for later use. The back-up capability may be used for recovery of data in the event of a failure of the storage.

Figure 2:
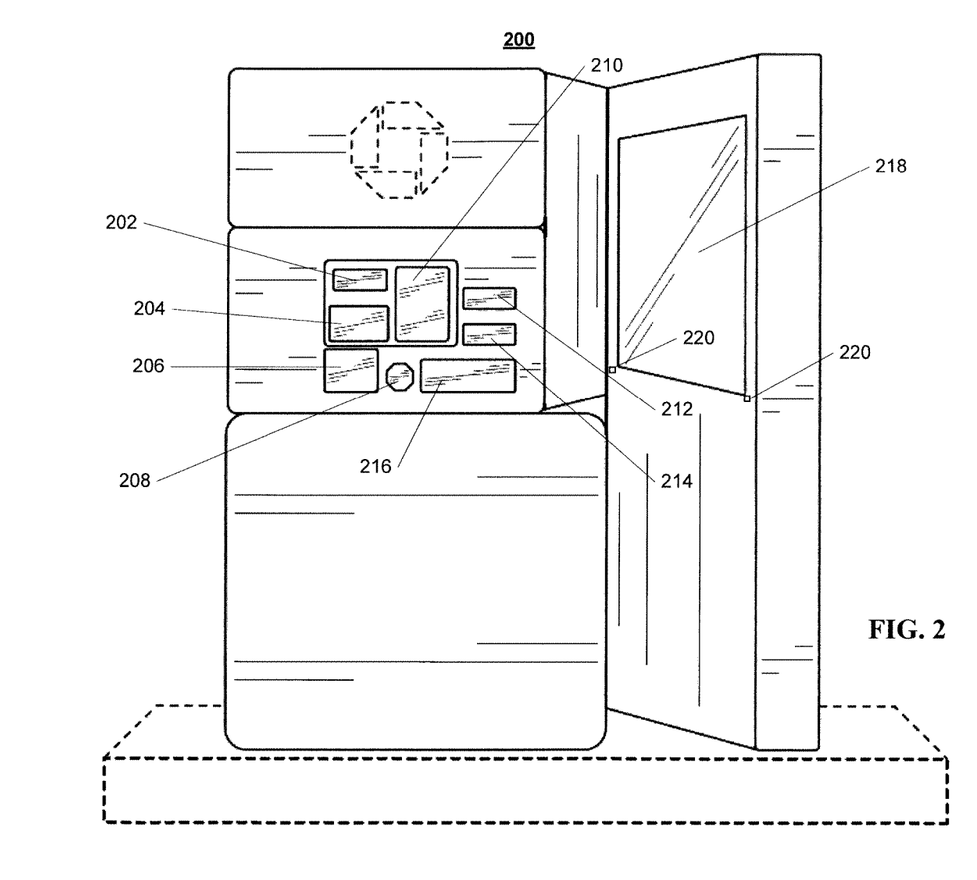
FIG. 2 is a front view of a financial services device in accordance with an exemplary embodiment.

FIG. 2 depicts a device according to an exemplary embodiment of the invention. The device 200 may provide various functionality and features associated with the financial services transactions. The device 200 may represent a device, such as device 110, 120, and 130, as shown in FIG. 1. More specifically, the device 200 may include a motorized EMV reader 202, a PIN pad 204, a multi-check depository 206, a NFC reader 208, a monitor 210, a receipt printer 212, a coin dispenser 214, a cash in/out recycler 216, and a display 218. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 100 may be integrated into, have, and/or be run on/by a computer, which may include a programmed processing machine which has one or more processors. Such a processing machine may execute instructions stored in a memory to process the data. The device 200 may be integrated into and run on one or more computer networks which may each have one of more computers associated therewith.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

The device 200 may be financial services machine. For example, the device 200 may be an ATM. The ATM may be configured as a drive-up ATM such that customers use the ATM from their vehicle. The device 200 may be configured to support a variety of passenger vehicle sizes. The configuration of the device 200 may be optimized to ensure that the location of the various components of the device 200 with which the customer interacts are located within the normal reach range, limiting location of components to at least that reach range or possibly including an extended reach range and trying to avoid location of components in the extreme reach range or critical deviation.

It should be appreciated that the device 200 may be used by customers on foot. The device 200 may be located outside according to exemplary embodiments. Accordingly, the device 200 may be constructed to be weatherproof and designed to operate in the elements. According to exemplary embodiments, the device 200 may be 70 inches high.

Furthermore, the device 200 may be configured in different sizes to accommodate different vehicles. For example, a larger device 200 may be used at a truck stop or a RV park to accommodate bigger vehicle types. According to some embodiments, the device 200 may be two sided in that the device 200 can serve two different customers at once—one on at each side. the two sides may have the same features as described herein. The two sides may be mirror images of one another or may differ in appearance. According to some embodiments, the device 200 may be located at a service station or similar location such that the device 200 is integrated with a fuel dispensing device, such as, for example, a gas pump. This embodiment may enable a customer to fuel their vehicle and conduct a financial transaction at the device 200. It should be appreciated that fuel dispensing device may include a charging station for an electric or hybrid vehicle.

The motorized Europay, MasterCard, and Visa ("EMV") reader 202 may be a card reader. For example, the reader 202 may be configured to read an appropriate card from the customer, such as an integrated chip card that is designed to interact with EMV readers, such as, but not limited to, VSDC, M/Chip, AEIPS, J Smart, D-PAS, CAP, and DPA. The EMV reader 202 may be configured according to appropriate standards and definitions for interaction with the card.

The PIN pad 204 may consist of a numeric pad. Alternatively, the PIN pad 204 may be an alpha-numeric keypad. The PIN pad 204 may be a physical or virtual pad. The PIN pad 204 may support customer entry of a PIN (Personal Identification Number). The PIN pad 204 may also have other entry functions, such as serving as an interface for customer entry of data or information required to complete a transaction.

The multi-check repository 206 may allow a customer to deposit items into the ATM. For example, checks or other papers may be deposited. The multi-check repository may be a slot or other opening in the device 200. The opening may be configured to be normally closed and then open at appropriate times for customer use.

The Near Field Communications (NFC) reader 208 may be configured to interact with NFC devices. For example, the NFC reader 208 may be capable of interacting with NFC enabled devices. For example, the NFC reader 208 may interact with portable electronic devices that are NFC capable such as, but not limited to, cellular phones, smart phones, tablets, e-readers, portable computers (e.g., laptops and netbooks), and personal data assistants (PDAs). Alternative embodiments of the device 200 may include other wireless communications capabilities to interact with portable electronic devices such as, but not limited to, wireless networking and radio frequency identification (RFID). Through wireless communication capabilities like NFC, a customer, through the appropriate electronic device, may interact with the device 200. The interaction may be used to authenticate the customer to the system and to conduct transactions with the system.

The NFC reader 208 may be shaped in the form of a logo or trade dress that is associated with a financial institution that operates the device 200. For example, the NFC reader 208 may in the shape of the Chase logo. Thus, the NFC reader 208 may serve as both a branding device and a interaction device. According to some embodiments, the NFC reader 208 may be illuminated or back lit.

According to alternative embodiments, the device 200 may have one or more biometric sensors. The biometric sensors may be in place or in addition to the wireless capabilities described above. For example, the device 200 may have a retinal scanner or fingerprint/handprint scanner. Such sensors may prevent unauthorized use of the device 200 to conduct fraudulent transactions.

The monitor 210 may be a display. The monitory 210 may be a touch screen display. The monitor 210 may be various sizes. For example, the monitor 210 may be 8 to 9 inches in size.

The receipt printer 212 may print and dispense receipts to the customer.

The coin dispenser 214 may dispense coin currency to the customer.

The cash in/out recycler 216 may be configured to dispense and receive cash or paper currency from the customer. Like the repository 206, the recycler may have an opening that is normally closed but opens at appropriate times for customer user.

The display 218 may be used to display information to the customer. The display 218 may be a high definition (HD) type display. The display 218 may have an integrated camera therein. The camera may be a digital camera. The camera may also serve as a sensor. The display 218 and the monitor 210 may have screen filters for privacy such that only the customer can see the information thereon and a customer behind them, such as in another vehicle, cannot see the information displayed.

According to exemplary embodiments, the device 200 may be configured to carry out the methods as described herein. The device 200 may use the monitor 210 and the display 218 to convey information to the customer. Information may be split between the monitor 210 and the display 218. For example, the monitor 210 may be used as the interaction point for the customer. The monitor 210 may display information and instructions relevant to the transaction the customer is conducting and the display 218 may be used to convey advertisements and/or marketing information to the customer. The customer may be able to select, using the monitor 210, the information or media that is displayed on the display 218. The monitor 210 may allow entry of information through a touch screen interface. The display 218 may display information related to such an entry. For example, the customer may enter information relating to a transaction at the monitor 210 and the display 218 may display information corresponding to the entry. The display 218 may display prompts or other reminders for the customer. These prompts and reminders may be related to the transaction. The display 218 may display media such as advertising related media or other informational media. The display 218 may display a combination of media and transaction related information.

The information and/or media displayed on the display 218 may be tailored to the specific customer. The tailoring may be based on the customer's profile maintained by the associated financial institution. The tailoring may be based on information contained in such a profile such as transaction history, accounts, demographic information, etc. The media displayed may also be general in nature and not specific to the customer. The general media may be based on the are where the device 200 is located or based upon other factors, such as time of year or a current promotional associated with the financial institution or merchant that is associated with or otherwise partnered with the financial institution.

In the two sided configuration of the device 200 (described above), the second display 218 may be located on the reverse side of the display 218 shown in FIG. 2. The display 210 and the other features of the device 200 may be located on the reverse side of the device 200 exactly opposite those shown in FIG. 2.

The device 200 may have one or more sensors for detection of the customer and/or the customer's vehicle. The sensors may detect and identify the customer. For example, the vehicles make/model and/or license plate may be detected. Through correlation of this detection, the customer may be identified. Other methods may be used to identify the customer. For example, if the customer is not in a vehicle, the sensor may be configured to perform facial recognition of the customer. Alternative embodiments may use other detection methods such as detection of a customer's portable electronic device or detection of a customer's toll pass, such as an EZ-Pass.

According to some embodiments, the display 218 may have one or more sensors 220 associated therewith. The sensors may not be visible to the customer. For example, the device 200 may have a sensor 210 located on each side of the display 218. A plurality of sensors 210 (that is, more than the two shown) may be located around the periphery the display screen 218. A series of sensors may ring the display 218 to ensure the best possible sensing of the customer and/or the vehicle given that customers and vehicles may have a range of heights. The sensors may be spaced apart with the periphery of the display 218. It should be appreciated that sensors 220 may also be located on other regions of the device 200.

The sensors 220 may be optical sensors. For example, the sensors 220 may be digital cameras or equivalent devices. The sensors may be positioned such that they are angled or otherwise positioned to focus on a particular area in space in front of the device 200 to sense the customer and/or vehicle at a predetermined distance from the device. The sensors may incorporate facial or shape recognition technology. For example, the sensors may image or otherwise detect the customer or the customer's vehicle. In some embodiments, the customer's facial area may be recognized by the sensors. The customer may be detected through the windshield of the vehicle. The device 200 may then compute the height of the customer's face. Using that computation, the screen height or display area of the display 218 may be adjusted for the customer's computed height of eye. Other types of sensors may be used. According to some embodiments, a combination of sensor types may be used.

By adjusting the display area 218 to an appropriate height based on the customer and/or vehicle size, the information displayed on the display 218 may be better conveyed to the customer for viewing. For example, if the customer is in a pick-up truck or large SUV, the customer's height (specifically, the height of eye) will necessarily be higher than a customer in a sedan, on a motorcycle, or on foot. Thus, the display 218 may be adjusted (in the case of the SUV example, adjusted upwards) to ensure optimal viewing of the information on the display. In so adjusting the display area height, it should be understood that less than the entire display area may be used. For example, for a customer in a SUV, the top portion of the display 218 may be used since the lower portion may not be fully visible or may be less than optimal for viewing based on the customer's height of eye.

Once identified, the device 200 may customize the information on the monitor 210 and the display 218 for the customer. For example, the display 218 may display an ad for a home equity if the customer is identified as a new homeowner. It should be appreciated that the customer may be required to perform further confirmation of their identity for security purposes. For example, the customer may be required to dip or swipe a card or enter a PIN code or other information into the device 200.

The customer may be able to configure or select options relating to the ads or information displayed on the monitor 210 and/or the display 218. For example, the customer may select options to display children friendly information or ads, such as cartoons, on the display 218 for children in the back seat of their vehicle.

According to some embodiments, the system 200 may be capable of interfacing with an onboard computer system of a vehicle. Many vehicles have onboard computing systems which include a display. Many such displays have touch screen or other input capability. The device 200 may be capable of interfacing with this system through a wireless path. For example, a Bluetooth or other wireless connection such as an 802.11 standard connection may be used. The device 200 may then use the vehicle's own display to convey information to the customer and allow the customer to conduct their transaction, or at least part of it, from within their vehicle. For example, the display of the vehicle may be used to display ATM options for selection by the customer. It should be appreciated that the monitor 210 and the display 218 may still provide display of information to the customer in this situation.

It should be further appreciated that the device 200 may be capable of wirelessly interacting with a portable electronic device associated with the customer in a similar manner to the interaction with the vehicle's computer system as described above. Such wireless capability may enable the customer to conduct a transaction from their portable electronic device. In such a situation, the display 218 may still display media and/or information to the customer as described above.

The device 200, through the display 218 and the monitor 210, may have the capability to provide audio and video interaction between the customer and a customer service representative or teller.

Figure 3:
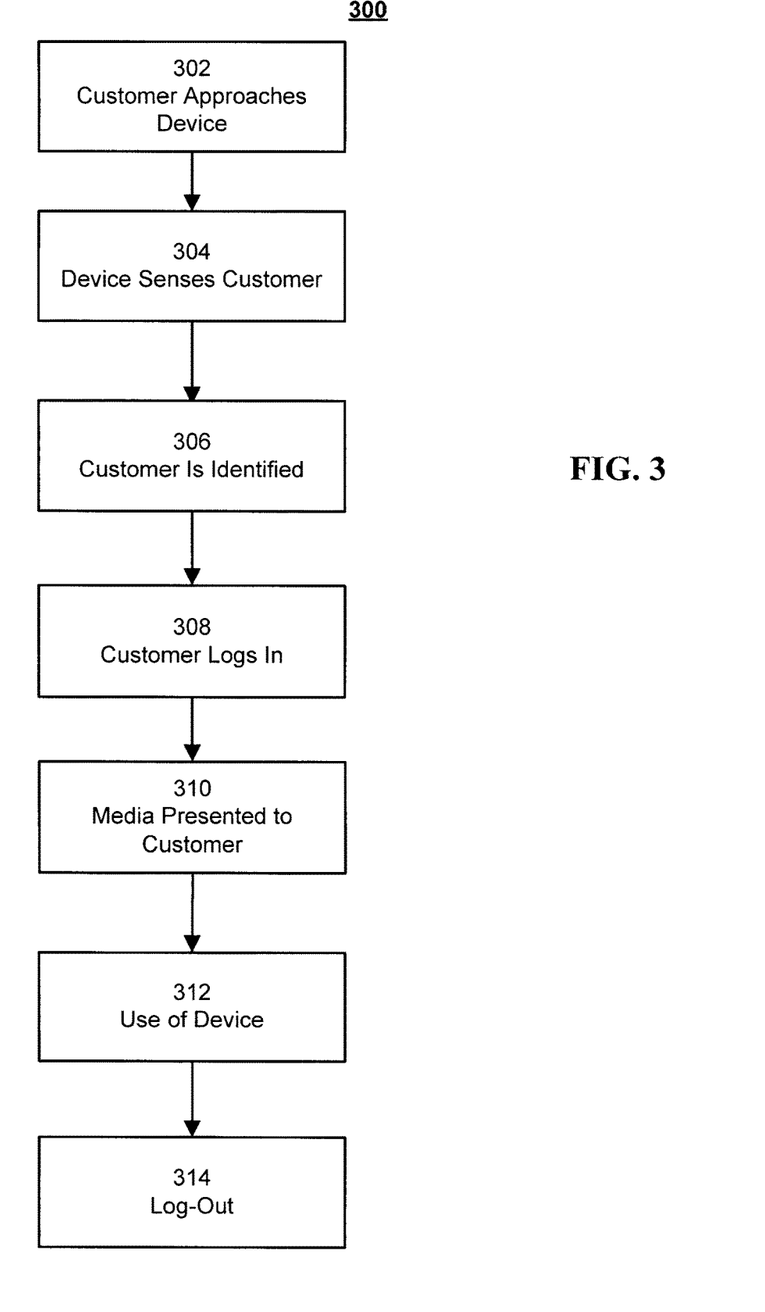
FIG. 3 is a flow chart of a method of using a financial services device in accordance with an exemplary embodiment.

FIG. 3 depicts a flow chart of a method of interfacing with a financial services device according to exemplary embodiments. Exemplary method 300 is provided by way of example, as there are a variety of ways to carry out the methods disclosed herein. The method 300 as shown in FIG. 3 may be executed or otherwise performed by one or a combination of various systems, such as a computer implemented system. Each block shown in FIG. 3 represents one or more processes, methods, and/or subroutines carried out in the exemplary method 300. Each block may have an associated processing machine or the blocks depicted may be carried out through one processor machine. According to exemplary embodiments, the method 300 may be conducting using a device such as the device 200 depicted in FIG. 2 that may be a part of the system 100 depicted in FIG. 1.

At block 302, a customer approaches a device. The device may be a drive-up financial services device or ATM, for example. According to exemplary embodiments, the customer may approach the device in a vehicle. It should be appreciated however that the customer may approach the device on foot. It should be appreciated that the use of the term ATM in the present method is meant to be exemplary and non-limiting. For example, the term financial services device may be substituted.

The drive-up ATM may be located outside of or near a branch office of a financial institution. The ATM may alternatively be located at a retailer or merchant. For example, a financial institution may have an agreement with a merchant to allow an ATM according to exemplary embodiments to be located near a merchant's location. The customer may have one or more accounts with the financial institution associated with the ATM. It should be appreciated that the customer may be associated with a different financial institution but may still be able to use the ATM. Since the ATM is a drive-up ATM, it may be located at an exterior location. It may be located with other such devices.

At block 304, the ATM senses the customer. Upon the customer approaching the ATM, such as in a vehicle, the ATM may sense the customer. The sensing may occur at a predetermined distance from the ATM. In some embodiments, the sensing may occur upon the customer touching, contacting, or otherwise interacting with the ATM. For example, the customer may pull up next to the ATM and reaching out of the vehicle window to touch or otherwise make contact with the ATM. The result of the sensing may involve the ATM acknowledging or indicating the customer's presence. For example, the ATM may "turn-on" or otherwise activate in a manner visible to the customer. The ATM may turn-on a large display, such as the display 218, and display information or advertisement(s) for the customer.

As described above, the sensing may be performed in a variety of manners. For example, the sensing may occur through interaction or contact with the ATM. The sensing may be performed using one or more sensors. For example, a digital camera or an optical device may be used. The sensors may be heat sensing. A combination of sensors may be used. The plurality of sensors may be located a various positions on the ATM. According to exemplary embodiments, the sensors may be located in the front portion of the ATM. However, sensors may be located on the sides or the back of the ATM to account for differing approach angles to the device. The ATM may use audio functions to convey a message to the customer regarding the sensing and acknowledgement of the customer's presence.

As depicted in FIG. 2, the ATM may have sensors on an angled portion. These sensors may be so located as to effectively sense a vehicles approach. The sensors, in addition to sensing the approach, may further serve to identify the approaching vehicle and customer. This identification may be done by optically reading the vehicle license plate or other identifying information on the vehicle, such as the vehicle make, model, and color. Facial or other recognition of the vehicle driver may be used. A transponder such as a toll transponder (e.g., an EZ-Pass) may be interrogated. In some embodiments, a portable electronic device associated with the customer may be sensed through wireless emissions, such as RFID, NFC, wireless, or Bluetooth.

At block 306, the ATM identifies the customer. Once the sensor(s) obtain the information, it may be matched to information contained in a database, such as a customer database. In this manner, a customer may be identified and the ATM may personalize its recognition of the customer such as by greeting the customer by name and/or displaying information related to the customer on its display, such as display 218. It should be appreciated that a smaller display on the ATM, such as display 210 may be used in combination with or in place of the larger display.

A block 308, the customer logs onto/into the ATM. The log in may be performed using a designated log-on method for the device. The device may offer more than one log on method. This process may serve to authenticate the customer's identity. Various methods may be used to authenticate the customer and allow them to access the device. For example, the customer may swipe or otherwise present a card or similar designated device, or enter a password or PIN into an alphanumeric entry device, such as a PIN pad, for example. The customer may use a portable electronic device to log-on to the device using a wireless communication path. For example, NFC may be used. Other log-in methods are possible, such as biometrics. For example, a fingerprint scan or retinal scan may be used to log into the device. A combination of log-on methods may be employed. For example, the customer may provide a retinal scan and then enter a code into a keypad. The log-in may be used to authenticate the customer and prevent fraud.

According to some embodiments, upon a successful log-in or authentication sound or series of sounds may be played. This sound may be distinct and associated with the financial institution that operates the device. The sound may be a series of sounds. Through the use of the sound, the customer may be informed in an auditory manner of successful log-in to the device. The sound may include a voice saying a phrase, such as, for example, "Welcome," or "Welcome, (customer name)," or "Welcome back, (customer name)." These examples are meant to be exemplary and non-limiting. This sound may be in addition to any visual cues of the successful log-in presented by the device. For example, the device may play a sound and flash one or more lights, such as on the NFC reader 208 to indicate to the customer they have logged in and been authenticated successfully.

At block 310, media is presented to the customer. Upon a successful log-on, the customer may be presented media. The media may be presented on a large display, such as display 218. The customer may be presented with options to select particular media. For example, on the smaller display, a list of options may be presented to the customer. The customer may select a desired option. In some embodiments, the media displayed may be tailored for the customer based upon their profile. In other embodiments, the customer may predetermine the media desired. For example, the customer, through a web site or other interface, may be able to select particular options pertaining to media they desire to be presented to them. The options may include types of advertisement or other information regarding financial institution programs. For example, the customer may be interested in rewards programs, so they may desire to see information pertaining to such programs and the rewards available. The media may be personally tailored to the particular customer. For example, the rewards program media may show information pertaining to the customer's own rewards program and actual rewards they are eligible for. In some embodiments, the media presented may relate to news, weather, entertainment, or sports. A combination of media may be displayed. For example, the display may have the capability to display a variety of information at once using different parts of the screen. The display may be multiple screens. The customer may be able to customize the display layout. This customization may be done through a website or it may be performed at the ATM.

The media presented may include account information pertaining to the customer. For example, once logged in, the customer may be presented with an overview of their accounts on the large screen and may select appropriate transaction options using the smaller screen which may be a touch screen as described above. It should be appreciated the privacy filters may be used on the display to prevent others from viewing the account data. A combination of marketing, information, and account information may be displayed.

At block 312, the customer uses the ATM. The ATM may be used through a set of menu options for performing various actions. For example, the customer may use the ATM to conduct one or more financial transactions, such as, but not limited to, a deposit or cash withdrawal. A variety of other transactions may be performed as appreciated by one of ordinary skill in the art.

At block 314, a log-out of the ATM is performed. The customer may log-out of the ATM, ending the present session.

Figure 4:
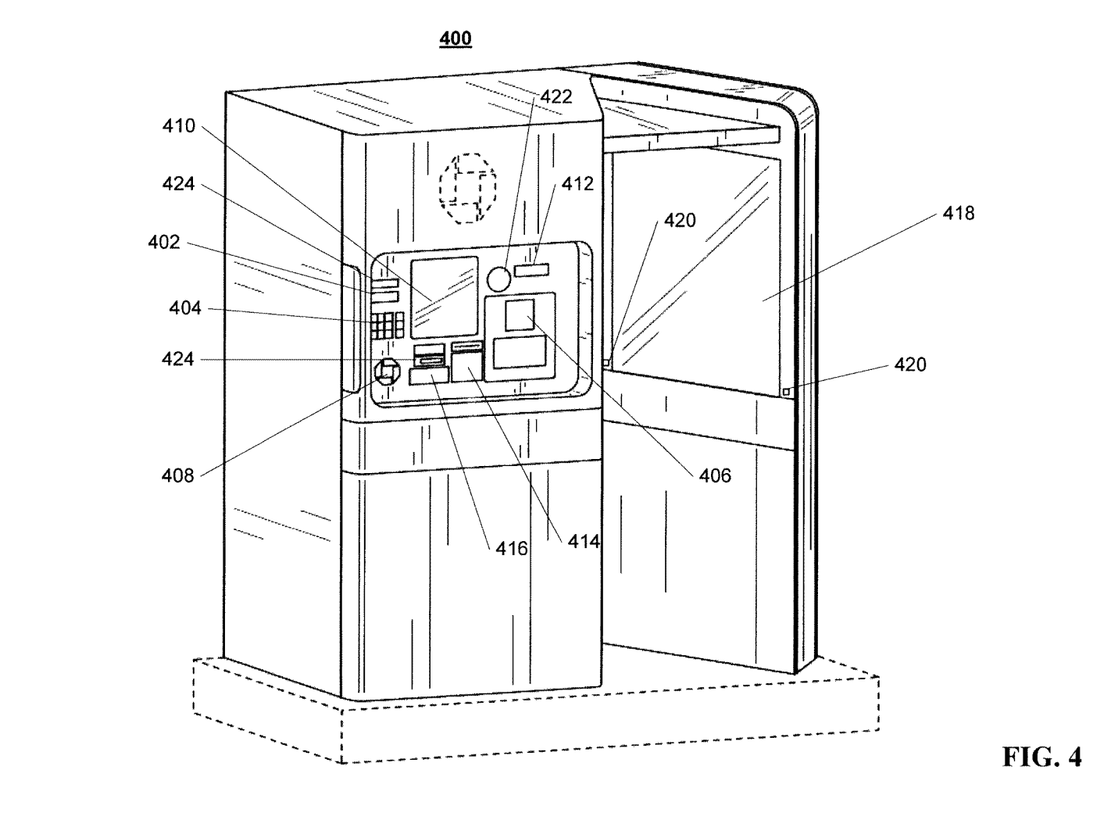
FIG. 4 is a perspective view of a financial services device in accordance with an exemplary embodiment.

FIG. 4 depicts a device according to an exemplary embodiment of the invention. The device 400 may provide various functionality and features associated with financial services transactions. The device 400 may represent a device, such as device 110, 120, and 130, as shown in FIG. 1. The device 400 may be configured in a similar manner to the device 200 and may provide similar functionality. The device 400, as shown in FIG. 4, may be configured with a different structure than the device 200. More specifically, the device 400 may include a motorized EMV reader 402, a PIN pad 404, a multi-check depository 406, a NFC reader 408, a monitor 410, a receipt printer 412, a coin dispenser 414, a cash in/out recycler 416, a display 418, sensors 420, and a camera 422. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 100 may be integrated into, have, and/or be run on/by a computer, which may include a programmed processing machine which has one or more processors. Such a processing machine may execute instructions stored in a memory to process the data. The device 400 may be integrated into and run on one or more computer networks which may each have one of more computers associated therewith.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

The device 400 may be financial services machine. For example, the device 400 may be an ATM. The ATM may be configured as a drive-up ATM such that customers use the ATM from their vehicle. The device 400 may be configured to support a variety of passenger vehicle sizes. The configuration of the device 400 may be optimized to ensure that the location of the various components of the device 400 with which the customer interacts are located within the normal reach range, limiting location of components to at least that reach range or possibly including an extended reach range and trying to avoid location of components in the extreme reach range or critical deviation.

It should be appreciated that the elements of the device 400 as shown in FIG. 4 may perform similar functions to the similar elements shown in FIG. 2 for the device 200 (with the instant elements having a "4" for the first digit instead of a "2"). Accordingly, the descriptions for those elements from FIG. 2 are incorporated here by reference. For example, the monitor 410 and the display 418 may be similar to the monitor 210 and the display 218, and the sensors 420 may be similar to the sensors 220 as described above. The device 400 may have a camera 422 built-in. The camera 422 may be for security purposes to monitor and record images of a customer conducting the transaction. The camera images may be used to identify criminal activity. The device 400 may have one or more labels 424 on its face that describe each of its elements to aid customers in identifying the different features (only two are identified in FIG. 4, however, it should be understood that more labels may be present for the elements of the device 400). These labels may contain Braille to enable sight-impaired customers to read the label contents.

It should further be appreciated that on the devices 200 and 400 that the placement and arrangement of the elements is exemplary only and is meant to be non-limiting. A variety of arrangements and combinations are possible.

Hereinafter, aspects of implementation of the inventions will be described. As described above, the method of the invention may be computer implemented as a system. The system of the invention or portions of the system of the invention may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories and the data stores used in the invention may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions. It is also appreciated that the data storage performed by two distinct components as described above may, in accordance with a further embodiment of the invention, be performed by a single component. Further, the data storage performed by one distinct component as described above may be performed by two distinct components.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, REXX, Ruby, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of financial services devices, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

What is claimed is:

1. A financial services device, comprising:
    a computer processor;
    a first display, communicatively coupled to the computer processor, configured to receive entry of data relating to a transaction conducted at the financial services device;
    a second display, communicatively coupled to the computer processor, oriented at an angle to and to one side of the first display such that both the first and second display can be viewed simultaneously and the second display is larger than the first display and the second display displays transaction related information and other media;
    one or more sensors, communicatively coupled to the computer processor, configured to sense one or more of a customer, a facial area of the customer, and a vehicle at a predetermined distance from the financial services device and wherein the computer processor is configured to identify the customer based on customer information received from the one or more sensors;
    wherein the financial services device is configured to be used by the customer from the vehicle; and
    wherein further the computer processor is configured to compute a height of the face of the customer based at least on one or more of the sensed customer, sensed facial area, and the sensed vehicle, compute a height of eye of the customer based on the computed height of the face, and to adjust a display area of the second display, independently from the first display, based on the computed height of eye such that the adjusted display area of the second display arranges the display area being used for the display of the transaction related information and other media to correspond to the height of eye of the customer.

2. The financial services device of claim 1, further comprising:
   at least one input device.

3. The financial services device of claim 1, the first display further comprising a touch screen display.

4. The financial services device of claim 1, the second display further comprising a high definition display.

5. The financial services device of claim 1, further comprising:
   a camera configured to allow video interaction between the customer using the financial services device and a customer service representative located remotely from the financial services device.

6. The financial services device of claim 1, further comprising:
   one or more sensors configured to sense the presence of the vehicle in the proximity of the financial services device.

7. The financial services device of claim 1, the computer processor being further configured to perform an authentication of the customer based upon the customer information received from the one or more sensors.

8. The financial services device of claim 1, wherein the identification of the customer is performed based upon a matching of the customer information to a database of identifying characteristics of the customer.

9. The financial services device of claim 8, wherein the identifying characteristics comprise one or more of a vehicle type, a license plate of a vehicle, a facial structure of the customer, and a RFID emission from an electronic device associated with the customer.

10. The financial services device of claim 1, further comprising:
    an interface for communicatively coupling, through a wireless network, with a vehicle computer system such that the financial services device causes a display of information upon a display screen associated with the vehicle computer system through the communicative coupling.

11. The financial services device of claim 1, wherein the wireless system comprises a Bluetooth system.

12. The financial services device of claim 7, wherein the identification of the customer causes a display of media, on the second display, that is tailored to the customer based on a profile associated with the customer.

13. The financial services device of claim 12, wherein the tailored media displayed is based on receipt of one or more selections from an input device at the financial services device wherein the one or more selections are received from the customer prior to or during conduct of the financial transaction.

14. The financial services device of claim 1, further comprising:
    an interface for communicatively coupling, through a wireless network, with a portable electronic device such as to cause a display of information upon a display screen associated with the portable electronic device through the communicative coupling.

15. The financial services device of claim 14, wherein the customer is able to interact with the financial services device through the portable electronic device.

16. The financial services device of claim 10, wherein a customer is able to interact with the financial services device through the vehicle computer system.

17. The financial services device of claim 1, wherein the angle comprises a 45 degree angle.

18. The financial services device of claim 1, further comprising:
    a set of interfaces that allow customer interaction with the financial services device, the set of interfaces being ergonomically positioned on a face of the financial services device.

* * * * *